United States Patent
Marshall

(10) Patent No.: US 9,509,357 B2
(45) Date of Patent: Nov. 29, 2016

(54) REMOVABLE VEHICULAR ROOFTOP COMMUNICATION SYSTEM

(75) Inventor: Graham G. Marshall, Shoreham, NY (US)

(73) Assignee: MOTOROLA SOLUTIONS, INC., Chicago, IL (US)

(*) Notice: Subject to any disclaimer, the term of this patent is extended or adjusted under 35 U.S.C. 154(b) by 979 days.

(21) Appl. No.: 13/588,256

(22) Filed: Aug. 17, 2012

(65) Prior Publication Data

US 2014/0049912 A1   Feb. 20, 2014

(51) Int. Cl.
*H05K 5/03* (2006.01)
*H04B 1/3877* (2015.01)
*H04B 1/3888* (2015.01)

(52) U.S. Cl.
CPC .......... *H04B 1/3877* (2013.01); *H04B 1/3888* (2013.01)

(58) Field of Classification Search
CPC ............................. H04B 1/3877; H04B 1/3888
See application file for complete search history.

(56) References Cited

U.S. PATENT DOCUMENTS

| | | | | |
|---|---|---|---|---|
| 4,118,003 A * | 10/1978 | Dillow | .................... | F16M 13/02 248/231.41 |
| 5,106,141 A * | 4/1992 | Mostashari | ............... | B60P 3/14 108/116 |
| 5,181,044 A * | 1/1993 | Matsumoto | ............... | H01Q 9/36 343/700 MS |
| 6,411,884 B1 * | 6/2002 | Chutorash | .......... | G05B 19/0421 361/730 |
| 6,484,456 B1 * | 11/2002 | Featherstone | ............ | H01Q 1/08 362/249.09 |
| 6,802,237 B1 * | 10/2004 | Jones | ....................... | B63G 7/02 102/402 |
| 6,832,083 B1 * | 12/2004 | Oba | ..................... | G06F 21/6245 348/E7.081 |
| 6,866,335 B2 * | 3/2005 | Tolinski | .................... | B60J 7/043 296/216.05 |
| 7,294,783 B2 * | 11/2007 | Schneider | ........... | B60R 16/0239 174/72 A |
| 7,338,316 B2 * | 3/2008 | Blickle | ................. | H01Q 1/1214 439/546 |
| 7,358,910 B2 * | 4/2008 | Blickle | ................. | H01Q 1/1214 343/713 |
| 7,369,061 B1 * | 5/2008 | Sellers | ................... | B60Q 1/482 340/539.11 |
| 7,743,520 B1 * | 6/2010 | Jiorle | ....................... | G01C 9/28 33/366.11 |
| 2002/0009978 A1 * | 1/2002 | Dukach | .................. | G06Q 30/02 455/99 |
| 2002/0049717 A1 * | 4/2002 | Routtenberg | .......... | H04H 60/21 |
| 2002/0107010 A1 * | 8/2002 | Witte | .................. | B60R 25/2081 455/418 |
| 2003/0081120 A1 * | 5/2003 | Klindworth | ...... | G08B 13/19634 348/143 |
| 2003/0152145 A1 * | 8/2003 | Kawakita | ................. | H04N 5/77 375/240.12 |
| 2003/0182256 A1 * | 9/2003 | Otey | ....................... | G06Q 10/06 |
| 2004/0189537 A1 * | 9/2004 | Kinuzawa | ........... | H04M 1/0216 343/702 |
| 2005/0039700 A1 * | 2/2005 | Gillis | ................... | A01K 15/021 119/712 |
| 2005/0083404 A1 * | 4/2005 | Pierce | ..................... | B60R 11/02 348/148 |
| 2006/0010167 A1 * | 1/2006 | Grace | ................. | H04L 67/1095 |
| 2006/0016966 A1 * | 1/2006 | Hughes | ................ | G03B 15/006 250/221 |
| 2006/0095199 A1 * | 5/2006 | Lagassey | ............... | G07C 5/008 701/117 |

(Continued)

*Primary Examiner* — Jay Patel
*Assistant Examiner* — Joseph Suh
(74) *Attorney, Agent, or Firm* — Barbara R. Doutre

(57) ABSTRACT

A vehicular rooftop communication system (200) provides communication electronics (216) within a housing (210) formed of a removable rooftop enclosure (212) and a base (214). The housing (210) is removable and transferable to another vehicle. The vehicular rooftop communication system (200) does not require any access to the vehicle's trunk.

15 Claims, 3 Drawing Sheets

(56) References Cited

U.S. PATENT DOCUMENTS

| | | | |
|---|---|---|---|
| 2006/0116071 A1* | 6/2006 | Yegin | H01Q 1/22 455/3.02 |
| 2006/0187305 A1* | 8/2006 | Trivedi | G06K 9/00234 348/169 |
| 2006/0209190 A1* | 9/2006 | Walters | B60Q 9/005 348/148 |
| 2006/0261109 A1* | 11/2006 | Browne | B60R 9/055 224/309 |
| 2007/0027627 A1* | 2/2007 | Lawrence | G01S 19/35 701/469 |
| 2007/0195939 A1* | 8/2007 | Sink | B60Q 1/2611 379/37 |
| 2008/0100521 A1* | 5/2008 | Herbert | H01Q 1/1214 343/713 |
| 2008/0111750 A1* | 5/2008 | Yoshie | H01Q 1/3275 343/713 |
| 2008/0238643 A1* | 10/2008 | Malen | B60Q 9/00 340/438 |
| 2009/0174769 A1* | 7/2009 | Katz | G08B 13/19623 348/143 |
| 2009/0276643 A1* | 11/2009 | Saito | G06F 1/30 713/300 |
| 2010/0034317 A1* | 2/2010 | Nejah | H04B 1/082 375/316 |
| 2010/0109912 A1* | 5/2010 | Stokes | B64D 45/0015 340/945 |
| 2010/0110192 A1* | 5/2010 | Johnston | H04N 5/2251 348/148 |
| 2010/0280751 A1* | 11/2010 | Breed | G08G 1/161 701/414 |
| 2011/0133952 A1* | 6/2011 | McNamara | G08G 1/096716 340/905 |
| 2011/0249204 A1* | 10/2011 | Hamilton | G09F 21/04 348/837 |
| 2011/0259930 A1* | 10/2011 | Rossel | B60K 1/04 224/309 |
| 2011/0260470 A1* | 10/2011 | Ahmadi | B60L 8/00 290/1 R |
| 2012/0173045 A1* | 7/2012 | Conroy | F41H 5/06 701/2 |
| 2012/0249366 A1* | 10/2012 | Pozgay | H04B 7/18571 342/354 |
| 2013/0342405 A1* | 12/2013 | Ueno | H01Q 1/3275 343/713 |
| 2014/0028507 A1* | 1/2014 | Mierke | H01Q 1/1214 343/713 |
| 2014/0111647 A1* | 4/2014 | Atsmon | H04N 7/185 348/148 |
| 2014/0139730 A1* | 5/2014 | White | B64D 47/08 348/373 |
| 2014/0160284 A1* | 6/2014 | Achenbach | H04N 5/2251 348/143 |
| 2014/0195681 A1* | 7/2014 | Chan | H04L 41/0809 709/225 |

\* cited by examiner

REMOVABLE VEHICULAR ROOFTOP COMMUNICATION SYSTEM

FIELD OF THE DISCLOSURE

The present disclosure relates generally to communication systems and more particularly to public safety vehicular radio communication systems.

BACKGROUND

Public safety equipment is often incorporated, within a vehicular environment and typically located within the trunk of the vehicle. Space constraints in public safety vehicles can be problematic given the variety of vehicles and variations in internal trunk space. Currently electronic equipment for example, video recorders, modems, and extra fuse panels, used in public safety vehicles are mounted in the trunk of the vehicle, often on a sliding tray. The vehicle's trunk also stores other important hems such as flares, traffic cones, spare tire, and medical kit, to name a few. FIG. 1 shows an example of a typical vehicular trunk environment 100 in which a mobile two-way radio system 102 is installed along with a variety of non-communication type of equipment 104. In order to move the communications equipment 102 for servicing or to another vehicle requires the disassembly and re-assembly of the communication system.

Accordingly, it would be highly desirable to have an improved means for incorporating a public safety communication system within a vehicular environment.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
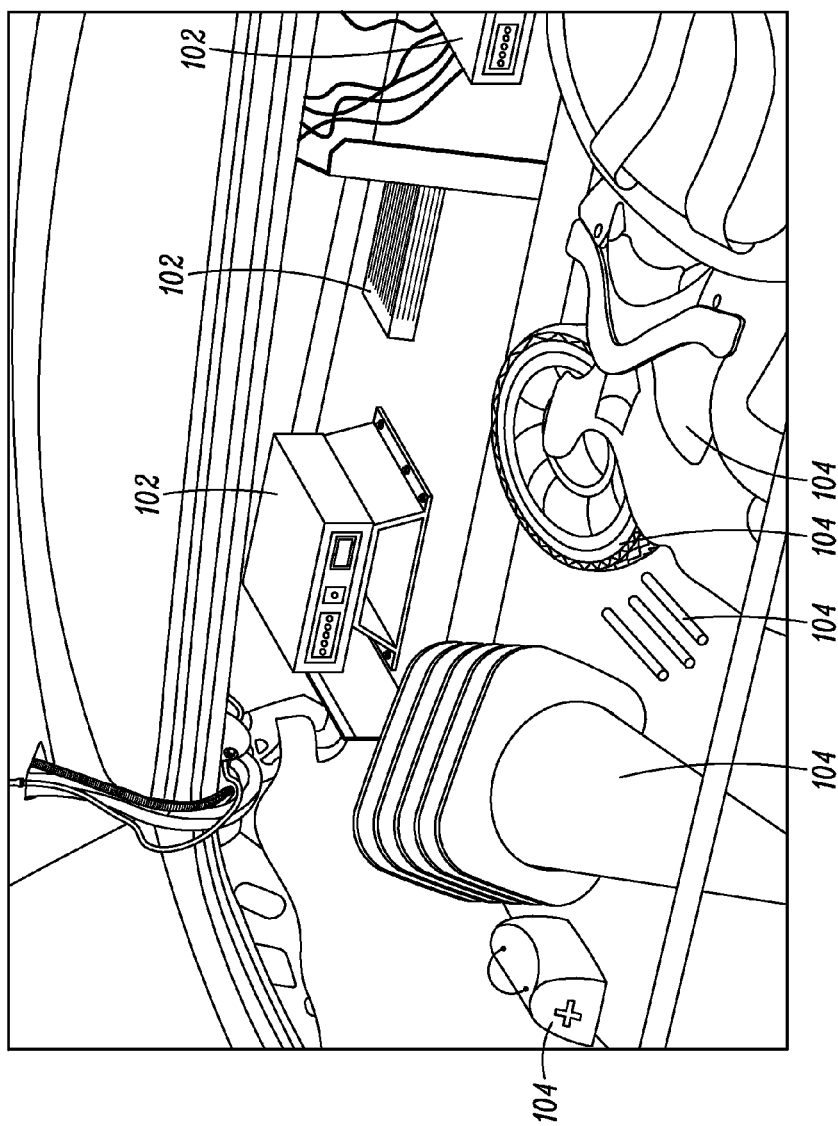
FIG. 1 illustrates a communication system mounted within a vehicular trunk in accordance with the prior art.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Briefly there is described herein, a vehicular rooftop communication system in accordance with various embodiments. The rooftop communication system removes all communication electronics from the previous mounting position in the trunk to a self contained enclosure on the roof of a public safety vehicle, such as a police patrol car. The communication electronics may comprise not only a mobile transceiver and controller, but also modems, fuse box, video recorders, and multi-media units, to name a few examples. The rooftop communication system is self contained and re-moveable from one vehicle to another and further provides accessibility to the communication electronics while on the rooftop. The rooftop communication system may be vented from the interior of the vehicle up into the enclosure. The communication electronics within the housing are thus cooled by the vented rooftop of the vehicle.

Figure 2:
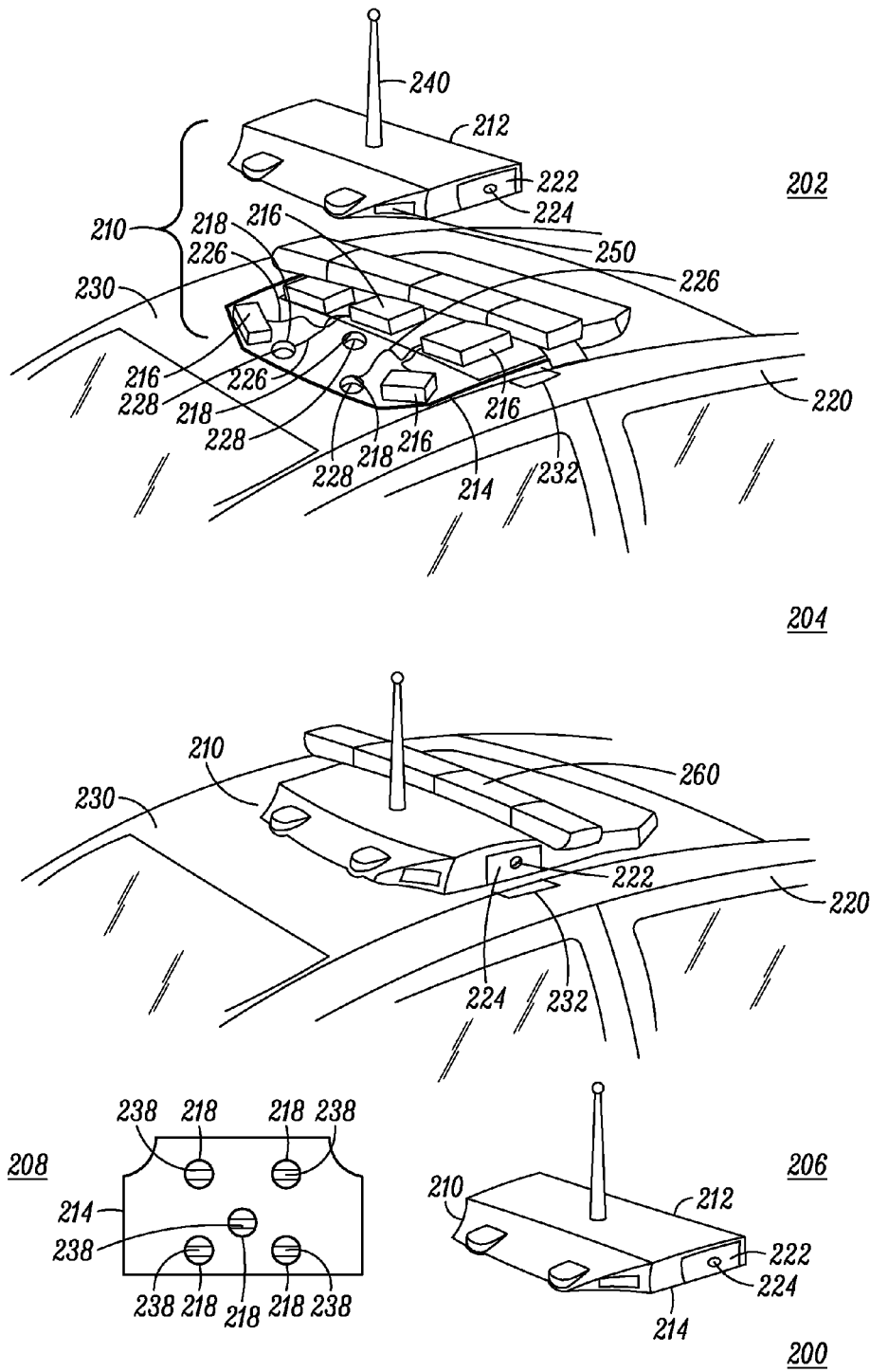
FIG. 2 illustrates a rooftop communication system in accordance with the various embodiments.

FIG. 2 illustrates a communication system 200 for a vehicle 220 formed in accordance with the various embodiments. Communication system 200 is shown in four views 202, 204, 206, and 208. In accordance with the various embodiments, the communication system 200, as shown in view 202, comprises a housing 210 formed of a removable rooftop enclosure 212 and a base 214 for encasing communication electronics 216. View 204 shows the complete housing 210 coupled to the vehicle 220. View 206 shows the housing 210 removed, from vehicle 220. This view 206 also shows the housing 210 comprising removable rooftop enclosure 212 coupled with base 214, which contain the communication electronics 216. Housing 210 containing the communication electronics 216 is thus transportable, for example to another vehicle or removable for servicing. View 208 shows the base 214 of housing 210. As seen in views 202 and 208, a plurality of apertures 218 may be formed within the base 214 for venting purposes in accordance with an embodiment of the invention.

Referring back to view 202, the ability to remove the rooftop enclosure 212 from the base 214 while the housing 210 is mounted on the vehicle 220 advantageously allows access to the communication electronics 216 while mounted to the rooftop. Such access can facilitate servicing of the communication electronics 216 while mounted to the vehicle. In accordance with the various embodiments, the housing 210 can be opened while attached to the vehicle 220, and alternatively the housing 210 can be transported as a whole unit. Thus, the vehicular roof top communication system 200 provides versatility in that the electronics within the housing 210 can be accessed while on the rooftop or removed and transported to another remote location.

In accordance with the various embodiments, the communication electronics 216 interface with radio electronics (shown later) within the interior of the vehicle 220 as well as with towers, bases stations, and dispatch centers via antenna 240 as part of a public safety communication system. As seen in view 202, interconnectivity between the communication electronics 216 on the rooftop 230 and the radio electronics within the vehicle 220 may be achieved via wired access 226 and/or wireless access. For wired access 226 to the interior of the vehicle 220, a plurality of apertures 218 are formed within the base 214 of the housing 210. The plurality of apertures 218 formed in base 214 align with corresponding holes 228 formed in the rooftop 230 of the vehicle 220 providing a pass-through for wired access 226 to the interior of the vehicle 220, via for example wires, flexes, cables, or other electronic interconnect means.

In accordance with the various embodiments, the alignment of apertures 218 of the base 214 with holes 228 of the rooftop 230 further provide venting to the housing 210 via the vehicle's air conditioning system. Additionally, as seen in view 208, vents 238 can be used to cover the apertures 218 and holes 228 while still leaving space within the pass-though for wired access 226. Even for wireless access between the communication electronics 216 and the radio electronics within the interior of the vehicle, the housing can be vented using the apertures 218 and holes 228 with A/C vents 238.

View 204 shows the removable rooftop enclosure 212 and the base 214 coupled via a closure mechanism 222, which may comprises snaps, clips, interconnecting slide interface, sliding access panel or other interconnecting means known in the art. The closure mechanism 222 further comprises a lock or locks 224 for securing the contents of housing 210 while either located on the rooftop 230 of vehicle 220 or as a stand-alone unit as housing 210. The housing 210 may be mounted via a mounting apparatus 232 to the rooftop 230 of the vehicle 220. The vehicle's mounting apparatus 232 may be formed by an adjustable strap and hook to the vehicle's door frame, bolted directly to the roof of the car, or other mounting apparatus means. As also seen in view 204, additional locks and securing mechanisms can also be utilized to secure the housing 210 to the rooftop 230 of vehicle 220. The housing 210 comprising the communication system 200 is thus removably coupled to and from the rooftop 230 via the mounting apparatus 232 and protected from unsecured access via closure mechanism 222 and locks 224. Housing 210 may further comprise windowed sections 250 for any communication electronics encompassing camera video recording.

As also seen in view 204, the communication system 200 is independent of the vehicle's rooftop light system 260 which further facilitates the removability and portability of the housing 210 without impacting the vehicle.

Figure 3:
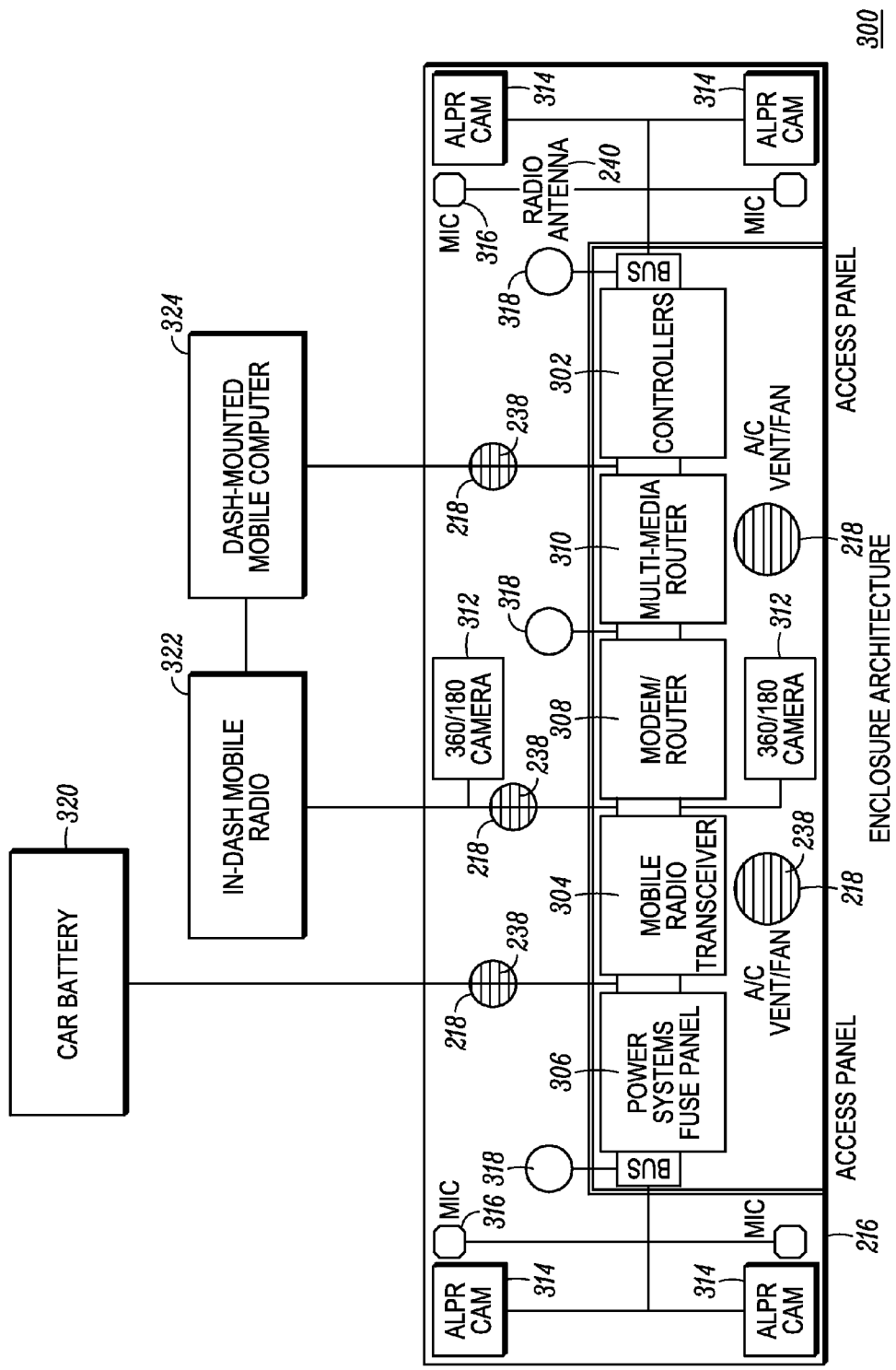
FIG. 3 illustrates a block diagram of the communication system in accordance with the various embodiments.

Referring to FIG. 3, there is shown a block diagram 300 of a communication system formed in accordance with the various embodiments. Communication system 300 comprises the communication electronics 216 of FIG. 2 and the interior radio components of the vehicle 220 which comprise car battery 320, in-dash mobile radio 322, and dash-mounted mobile computer 324. The communication electronics 216 may be accessed for example by an access panel of housing 210 of FIG. 2 after unlocking the housing 210. The communication electronics 216 comprise a controller 302, mobile radio transceiver 304, power systems fuse panel 306, and antenna 240. Further communications equipment may comprise routers, such as modem router 308 and multimedia router 310 which further intemperate via bus lines 318 with audio and visual components which may comprise cameras, such as digital panoramic cameras 312, automatic license plate recognition (ALPR) cameras 314, and microphones 316. The communication electronics 216 housed within the vehicular rooftop communication system 200 interoperate with the in-dash mobile radio 322 and the dash-mounted mobile computer 324 which are located in the interior of vehicle 220. The communication electronics 216 are powered by car battery 320 and further interoperate with base stations, towers and the like via antenna 240.

In accordance with the various embodiments, cooling of the communication electronics 216 is achieved via the apertures 218 which are vented via A/C vents 238. In accordance with the various embodiments, some of the apertures 218 and vents 238 further provide pass-through access for wired interconnect to the car battery 320, in-dash mobile radio 322 and dash-mounted mobile computer 324. Thus, apertures 218 may be formed to provide a pass-through for wired access to the interior of the car and/or for AC venting.

Accordingly, there has been provided an improved communication system for a vehicle. The vehicular roof top communication system provides versatility in that the communication electronics 216 within the housing 210 can be accessed while on the rooftop or removed and transported to another remote location. The communication system is thus easily serviced. The transferability of the communication system is extremely advantageous. For example, if a vehicle, such as a police patrol car, is involved in an accident, it is possible that the housing 210 with communication electronics 216 contained therein can be transferred to another vehicle. As vehicles are replaced within a fleet of public safety vehicles, the communication system can be transferred from vehicle to vehicle.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having,", "includes", "including,", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A communication system for a vehicle, comprising:
an in-dash mobile radio mounted within the vehicle;
a dash-mounted computer;
a car battery;
a housing mounted to a rooftop of the vehicle, the housing comprising communication electronics powered by the car battery and in communication with the in-dash mobile radio and the dash-mounted computer;
the communication electronics comprising:
   a controller;
   a mobile radio transceiver coupled to the controller;
   at least one antenna;
   a plurality of microphones;
   a power systems fuse panel; and
   a panoramic digital camera and an Automatic License Plate Recognition (ALPR) camera, the communication electronics being in communication with the in-dash mobile radio and the dash-mounted computer; and
the communication electronics being accessible by removing a removable rooftop enclosure of the housing while the housing is coupled to the vehicle; and
the housing also being removable and transferable to another vehicle.

2. The communication system of claim 1, wherein the communication system is not incorporated into a light system of the vehicle.

3. The communication system of claim 1, wherein the housing comprising the communication system is removably coupled to and from the rooftop via a mounting apparatus.

4. The communication system of claim 1, wherein the communication electronics within the housing are cooled by a vented rooftop of the vehicle.

5. The communication system of claim 1, wherein the communication electronics within the housing mounted on the rooftop are electrically coupled to a mobile radio within the vehicle.

6. The communication system of claim 1, wherein the housing further comprises:
vents for cooling the communication electronics.

7. The communication system of claim 1, wherein the housing comprises:
vents for cooling the communication electronics; and
an access panel for accessing the communication electronics.

8. The communication system of claim 1, wherein the communication electronics within the housing on the rooftop further comprise:
a multi-media router;
a modem router; and
the multi-media router, the modem router, the power systems fuse panel are controlled via the controller.

9. A communication system, comprising:
a housing removably coupled to a rooftop of a vehicle;
an in-dash mobile radio mounted within a vehicle;
a dash-mounted computer;
a car battery for powering the in-dash mobile radio and dash-mounted computer;
the housing comprising a removable rooftop enclosure and a base for encasing and accessing communication electronics comprising:
   a plurality of microphones;
   a power systems fuse panel;
   a plurality of cameras including a panoramic digital camera and an Automatic License Plate Recognition (ALPR) camera, the communication electronics interfacing with the in-dash mobile radio and dash-mounted computer within the vehicle as part of a public safety communication system.

10. The communication system, of claim 9 wherein the housing is transferable to another rooftop of another vehicle.

11. The communication system, of claim 9 wherein:
the communication electronics are accessible by removing the removable rooftop enclosure while the housing is coupled to the rooftop of the vehicle; and
the communication electronics are accessible by removing the housing from the rooftop of the vehicle and then removing the removable rooftop enclosure from the housing.

12. The communication system of claim 9, wherein the housing is vented.

13. The communication system of claim 9, further comprising:
holes formed in the rooftop of the vehicle;
apertures formed within the base of the housing, the holes aligning with the apertures;
vents aligned with the apertures within the base; and
wherein the removable rooftop enclosure is vented using the apertures and the vents which align with the holes of the rooftop.

14. The communication system of claim 9, wherein communication system is accessible without accessing a trunk of the vehicle.

15. The communication system of claim 9, wherein the communication system is independent of the vehicle's rooftop light system.

* * * * *